July 18, 1939.   R. D. AMSDEN   2,166,788
CONTROL CIRCUIT
Filed Aug. 31, 1938
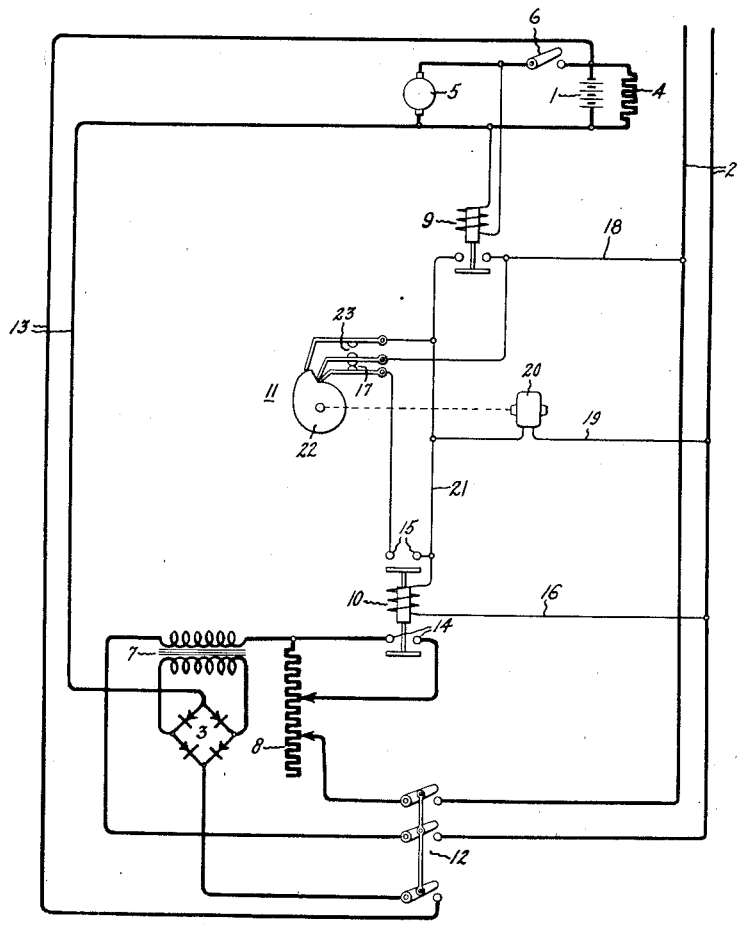
Inventor:
Ralph D. Amsden,
by Harry E. Dunham
His Attorney.

Patented July 18, 1939

2,166,788

UNITED STATES PATENT OFFICE 2,166,788

CONTROL CIRCUIT

Ralph D. Amsden, Lynn, Mass., assignor to General Electric Company, a corporation of New York Application August 31, 1938, Serial No. 227,768

2 Claims. (Cl. 171—314)

This invention relates to electrical control circuits and has for an object the production of a new and improved control circuit for automatic battery chargers.

The invention will be better understood from the following description taken in connection with the accompanying drawing and its scope will be pointed out in the appended claims.

The single figure of the accompanying drawing is a diagrammatic illustration of an embodiment of the invention.

Referring now to the drawing, a storage battery 1 is charged from a main alternating current supply circuit 2 through a rectifier 3. The battery is connected to supply substantially continuously a load of any kind which is represented diagrammatically by a resistance load 4. The battery is also arranged to supply a relatively heavy intermittent load shown by way of example as an internal combustion engine starter motor 5 which is arranged to be connected to the battery by means of a suitable switch 6.

Interposed between the rectifier and the alternating current supply circuit is a transformer 7 for changing the voltage of the supply circuit to a voltage corresponding to that of the battery. Serially connected in the transformer circuit is a resistor 8 for limiting the battery charging current. The effective value of the series resistor 8 is controlled by three relays 9, 10 and 11, respectively. Relay 9 responds to the energization of the intermittently applied load 5; relay 10 is a secondary relay controlled jointly by the primary relay 9 and the relay 11; and relay 11 is a timing relay which makes and breaks holding circuits for the secondary relay 10 and for itself.

A suitable control switch 12 is provided for permitting the circuit selectively to be put in and taken out of service. It serves to make and break connections between the supply circuit and the transformer and also to make and break connections between the rectifier and the battery.

The operation of the illustrated embodiment of the invention is as follows. With the parts in the positions shown in the drawing, assume that the control switch 12 is closed and that supply circuit 2 is energized by any suitable source of current supply (not shown). Closure of the control switch 12 connects the primary winding of the transformer 7 across the supply circuit 2 through all of the series resistor 8 and at the same time connects the output terminals of the rectifier 3 to the battery terminals through conductors 13. This provides a continuous relatively low rate of charge for the battery which maintains it in a properly charged condition by making up for its own losses and the losses caused by the load 4.

If now the starter switch 6 is closed, the relay 9, which is connected in parallel with the starter motor 5, will be energized. This will cause it to close its contacts, thereby connecting the relay 10 across the alternating current supply circuit. Relay 10 is provided with two sets of contacts 14 and 15 which close as soon as the relay is energized. Contacts 14 short circuit a section of the resistance 8, thereby boosting the rate of charge to a higher value so as to make up for the drain on the battery caused by the operation of the starter motor 5. The closure of contacts 15 completes a holding circuit for the relay 10. This circuit is as follows: from one side of the supply circuit through a conductor 16, the relay 10, the contacts 15 thereof and a set of normally closed contacts 17 on the timer 11 and back to the other side of the supply circuit through a conductor 18. By means of this holding circuit the relay 10 is sealed in automatically as soon as it closes its contacts so that no more than a momentary closing of the starter button 6 is required in order to increase the charging rate from the normally relatively low or trickle rate to the relatively high boosting rate.

At the same time that the holding circuit is completed for the relay 10 an energizing circuit is completed for the timer 11. This circuit is from the right hand side of the supply circuit through a conductor 19, an operating motor 20 for the timer, a conductor 21, the contacts 15 and 17 in series and back to the left hand side of the supply circuit through the conductor 18. As soon as the motor 20 starts it drives a cam 22 in a counter-clockwise direction. The cam is illustrated in its normal or reset position in which the contacts 17 are closed and a second (normally open) set of contacts 23 are open. As shown, all of the contacts of the timer are carried by spring fingers which bear against the face of the cam.

A cycle of operation of the timer corresponds to a complete revolution of the cam 22. Soon after the cam 22 starts turning in its counter-clockwise direction the contacts 23 will close. This, in effect, merely short circuits the portion of the holding circuit for the relay 10 and the energizing circuit for the timer 11 which comprises the serially-connected contacts 15 and 17. When the timer has nearly reached the end of its cycle of operation the lowermost of the three contact carrying spring fingers will be allowed to drop by the cam but the uppermost and the intermediate contact carrying spring fingers will be held in their uppermost positions. This causes the separation of the contacts 17 but as the contacts 23 remain closed the holding circuit for the relay 10 and the energizing circuit for the timer 11 is not opened. However, upon a slight further rotation of the cam 22 the intermediate spring finger will be allowed to drop from its uppermost position in which contacts 23 are closed to its lowermost illustrated position in which contacts 17 are closed. During this transition both sets of contacts 17 and 23 will momentarily be opened, thus breaking the holding circuit for the relay 10 and permitting it to drop out substantially instantaneously. As soon as the contacts 15 of the relay 10 open, the subsequent closure of the contacts 17 cannot energize the timer and consequently it comes to rest in the position illustrated. In this position it is ready for another cycle of operation. The opening of the contacts 14 of the relay 10 reinserts all of the resistance 8 in the charging circuit and thus cuts the charging rate down from a boosting rate to a low or trickle charging rate.

From the above description it will be seen that there has been provided a battery charger which will continuously charge a battery at a relatively low rate and that automatically in response to the application of an intermittently applied load to the battery the charging rate is stepped up to a higher rate for a definite predetermined time after which the charging rate is automatically restored to the initial relatively low value.

While there has been shown and described a particular embodiment of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In combination, an alternating current supply circuit, a storage battery, a rectifier connected between said supply circuit and said battery for charging said battery with rectified current obtained from said supply circuit, an intermittently operated load device for said battery, a switch for connecting said battery to said load device, a relay connected to be energized when said load is energized and to be de-energized when said load is de-energized, a secondary relay controlled by the first-mentioned relay, said secondary relay being provided with means for increasing the charging current supplied by said rectifier to said battery, a timer provided with two sets of motor operated contacts one of which is normally closed and the other of which is normally open, said secondary relay being provided with a set of contacts which close when said secondary relay increases the charging rate of said battery and which contacts cooperate with the normally closed contacts of the timer to establish a holding circuit for said secondary relay and for completing an energizing circuit for said timer, said timer being arranged when in operation to close its normally open set of contacts for a predetermined time at the expiration of which it opens its normally closed set of contacts and immediately thereafter successively reopens its normally open contacts and recloses its normally closed contacts, the closing of said normally open timer contacts being arranged to maintain completed said holding and energization circuits independently of the position of said normally closed timer contacts whereby said secondary relay and said timer remain energized when the normally closed contacts of said timer open, said secondary relay and said timer being de-energized during the interval of time between the reopening of said normally open set of timer contacts and the reclosing of said normally closed set of timer contacts.

2. In combination, a supply circuit, a controlled device having a set of contacts which close when said device is energized, a motor driven time switch having a set of normally open contacts and a set of normally closed contacts, said switch when energized in said normal position first closing its normally open contacts and after a predetermined time opening its normally closed contacts and thereafter successively reopening its normally open contacts and reclosing its normally closed contacts, circuit controlling means for connecting said controlled device to be energized by said control circuit, and a holding circuit for connecting said controlled device and the operating means for said time switch in parallel with each other across said supply circuit through the contacts of said controlled device and the normally closed contacts of said time switch in series, said normally open contacts being connected in parallel with the portion of said holding circuit which contains the contacts of said controlled device and said normally closed contacts of the time switch.

RALPH D. AMSDEN.